March 30, 1926.

S. H. PERKY 1,578,755

MACHINE FOR MAKING A FOOD PRODUCT FROM WHEAT GRAINS

Filed March 19, 1921          9 Sheets-Sheet 1

Inventor
Scott H. Perky
By
John W. Darley
Attorney

March 30, 1926.

S. H. PERKY 1,578,755

MACHINE FOR MAKING A FOOD PRODUCT

Filed March 19, 1921   9 Sheets-Sheet 3

Inventor
Scott H. Perky

By John W. Darley
Attorney

March 30, 1926.
S. H. PERKY
1,578,755
MACHINE FOR MAKING A FOOD PRODUCT
Filed March 19, 1921    9 Sheets-Sheet 4
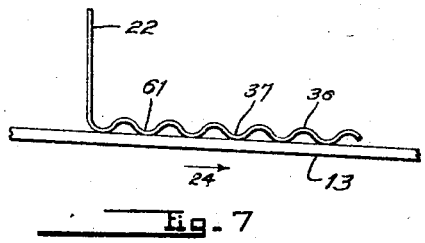
Fig. 7
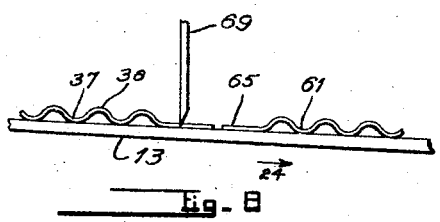
Fig. 8
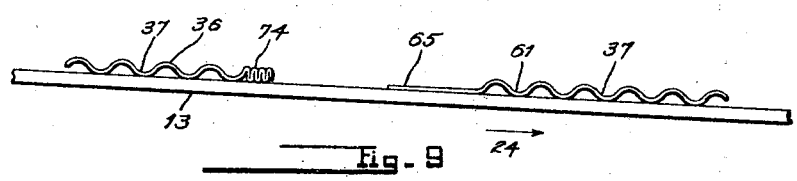
Fig. 9
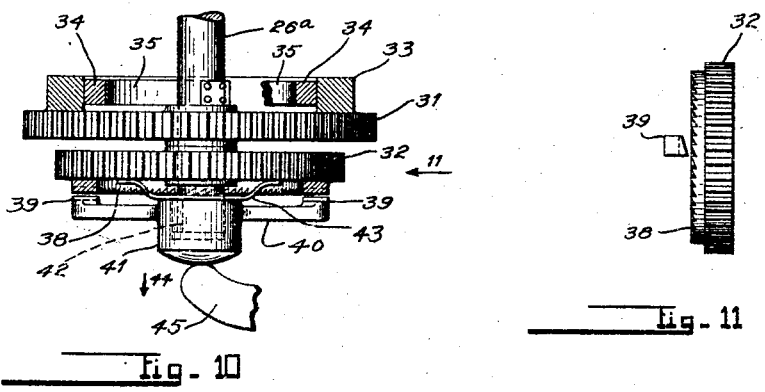
Fig. 10
Fig. 11
Inventor
Scott H. Perky
By John W. Darley
Attorney March 30, 1926.

S. H. PERKY 1,578,755

MACHINE FOR MAKING A FOOD PRODUCT

Filed March 19, 1921　　9 Sheets-Sheet 5

Inventor
Scott H. Perky
By John W. Darley
Attorney

March 30, 1926.

S. H. PERKY 1,578,755

MACHINE FOR MAKING A FOOD PRODUCT

Filed March 19, 1921    9 Sheets-Sheet 6

Inventor
Scott H. Perky

By
John W. Clarley
Attorney

March 30, 1926.

S. H. PERKY 1,578,755

MACHINE FOR MAKING A FOOD PRODUCT

Filed March 19, 1921

Inventor
Scott H. Perky

By John W. Clarley
Attorney

March 30, 1926.

S. H. PERKY 1,578,755

MACHINE FOR MAKING A FOOD PRODUCT

Filed March 19, 1921    9 Sheets-Sheet 8

Inventor
Scott H. Perky

By John W. Darley
Attorney

March 30, 1926.
S. H. PERKY
1,578,755
MACHINE FOR MAKING A FOOD PRODUCT
Filed March 19, 1921    9 Sheets-Sheet 9
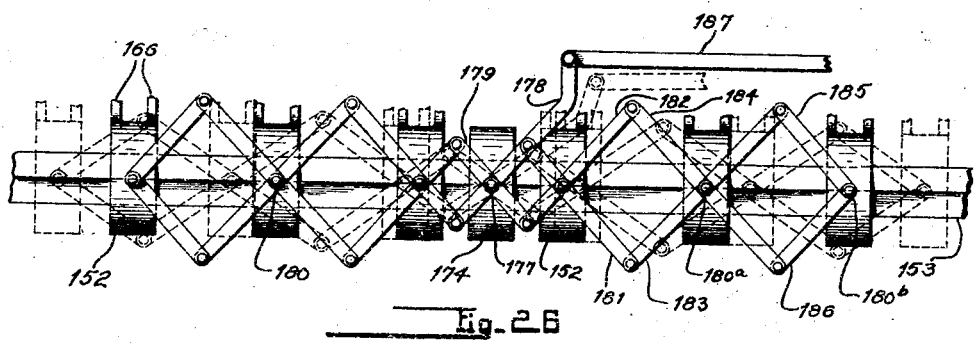
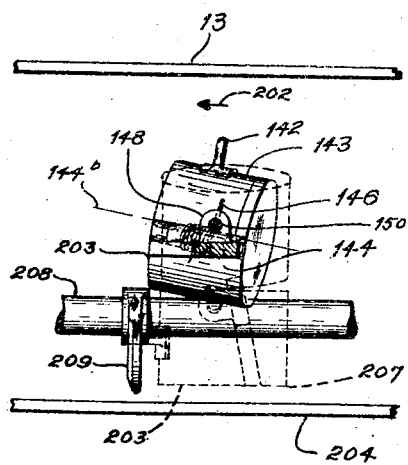
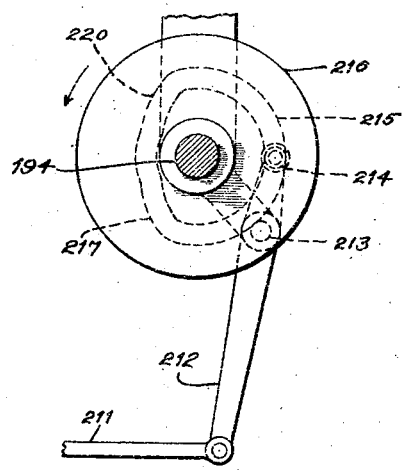
Inventor
Scott H. Perky
By
John W. Darley.
Attorney Patented Mar. 30, 1926.

1,578,755

UNITED STATES PATENT OFFICE.

SCOTT H. PERKY, OF KEESEVILLE, NEW YORK.

MACHINE FOR MAKING A FOOD PRODUCT.

Application filed March 19, 1921. Serial No. 453,584.

*To all whom it may concern:*

Be it known that I, SCOTT H. PERKY, a citizen of the United States, residing at Keeseville, in the county of Essex and State of New York, have invented certain new and useful Improvements in Machines for Making a Food Product; and I do hereby declare the following to be a full, clear, and exact description of the invention, such as will enable others skilled in the art to which it appertains to make and use the same.

My invention relates to machines for making food products.

Among the objects of my invention are:
To produce a machine for making a food product provided with a large number of interstices in order to insure thorough permeation of the product by the salivary and digestant juices during the processes of mastication and digestion.

To produce a machine for making a food product formed of a striated and corrugated ribbon rolled up in the form of a cylinder.

To produce a machine having means for reducing raw material to a ribbon like form, for forming said ribbon into any desired shape and afterward, drying or baking same without the intermediary of manual labor.

To produce a machine having the aforegoing characteristics which shall be comparatively simple, rapid in operation and capable of handling extremely friable structures without fracturing same.

These and other objects of my invention will be made apparent in the accompanying specification, reference being had to the accompanying drawings, and the means by which they are effectuated will be pointed out in the claims.

In the drawings:

Figure 1 is a side view of my improved machine.

Fig. 2 is a view of the machine shown in Fig. 1 looking in the direction of the arrow 2 in said figure. In this figure, the gears 19, 20, 55 and 56, the sprocket wheels 127, 129, 193 and 196, and the chains 128 and 195 are omitted for the sake of clearness.

Figure 1:
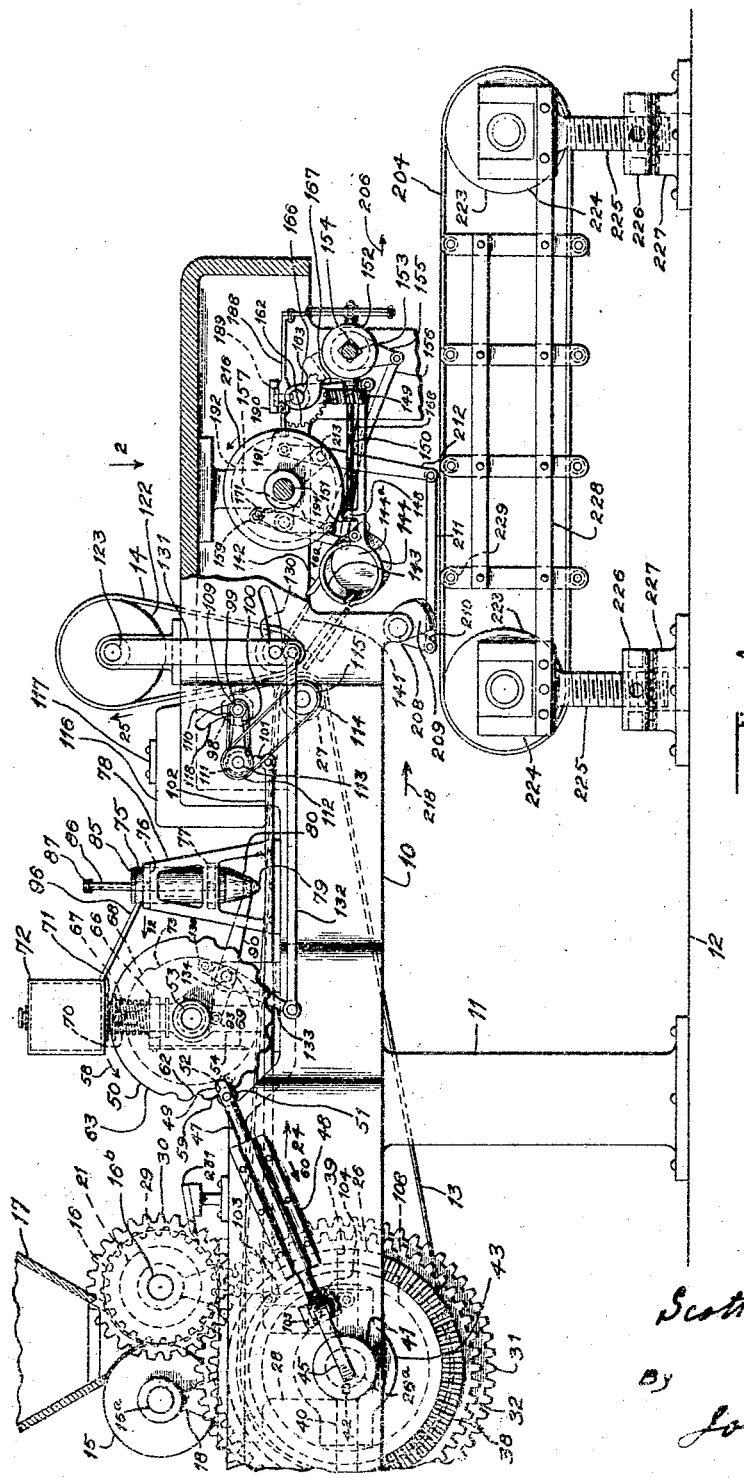

Figs. 7, 8 and 9 are side views of various positions assumed by the ribbon 22 during its travel upon the belt 13.

Fig. 10 is an enlarged detail view of part of the mechanism for driving the delivery drum 26 at a variable speed.

Fig. 11 is a view of the gear 32 and the cooperating clutch member when viewed in the direction of the arrow 11 in Fig. 10.

Figure 12:
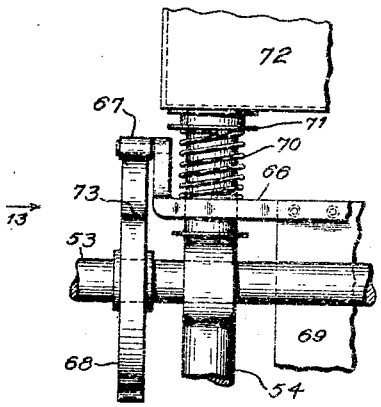

Fig. 12 is an enlarged detail view of a guide at one end of the cutter that is used for severing the ribbons, looking in the direction of the arrow 12 in Fig. 1.

Figure 13:
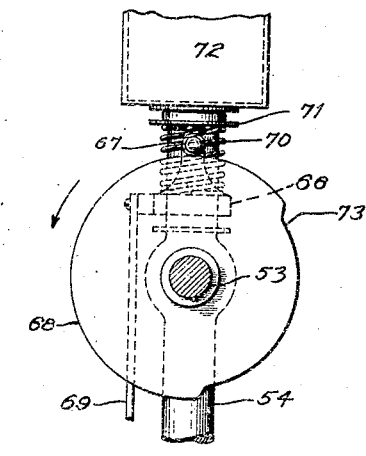

Fig. 13 is a view of the parts shown in Fig. 12 looking in the direction of the arrow 13 in said figure.

Figure 2:
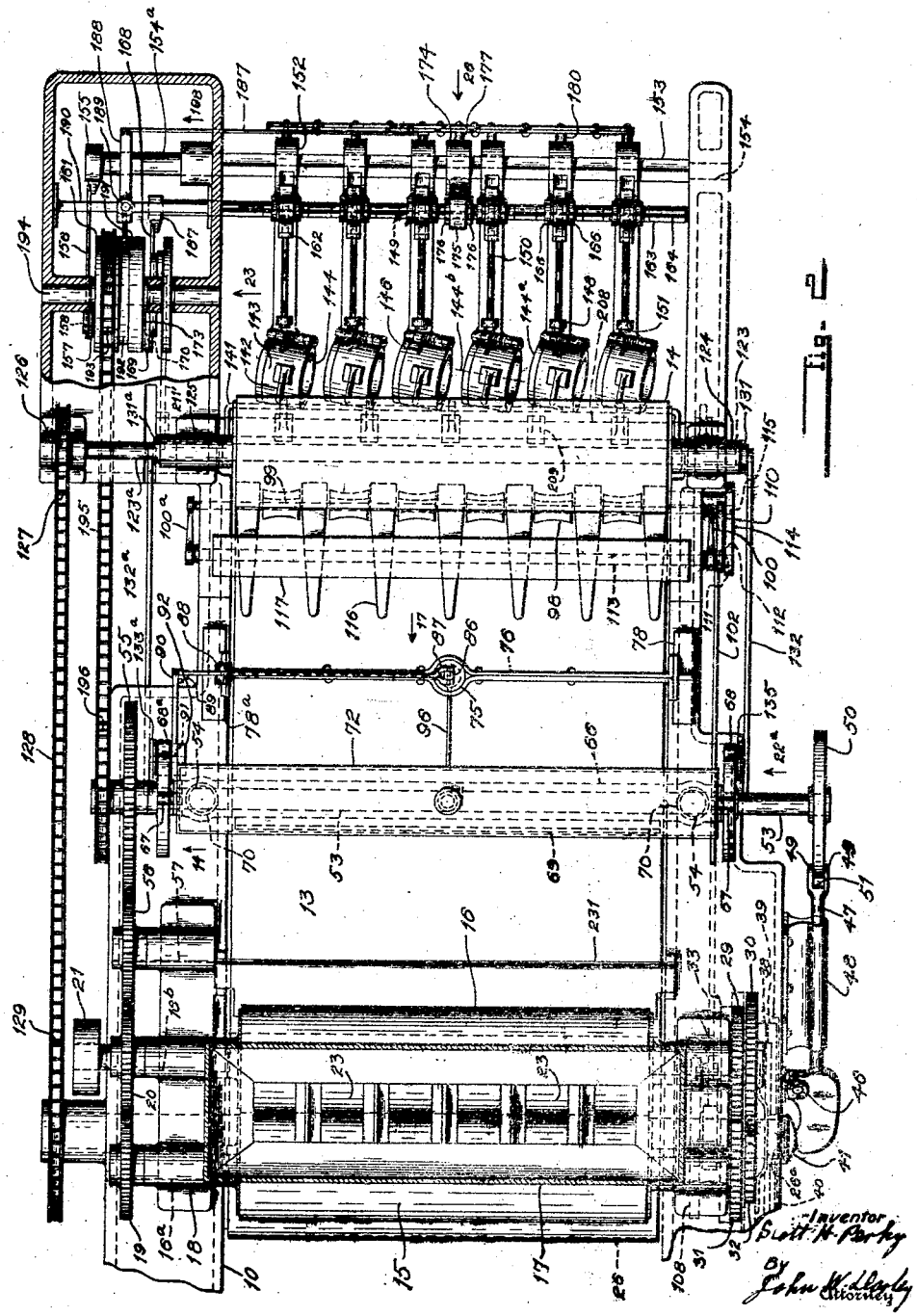
Figure 14:
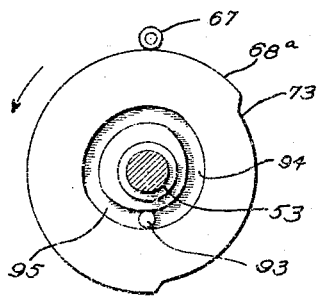

Fig. 14 is a view of one of the cams $68^a$ looking in the direction of the arrow 14 in Fig. 2.

Figure 15:
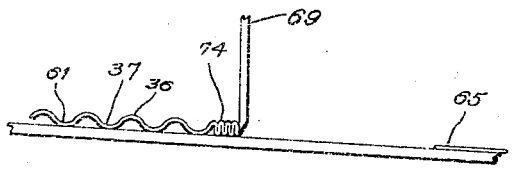

Fig. 15 shows the manner in which the corrugations are compacted at the beginning ends of the ribbons.

Figure 16:
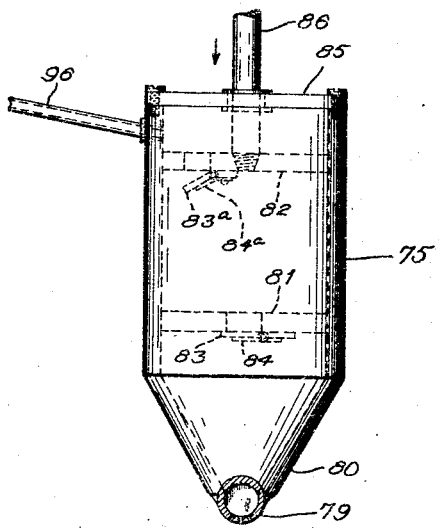

Fig. 16 is an enlarged detail view of the pump to force the moistening solution upon the ends of the ribbons.

Figure 17:
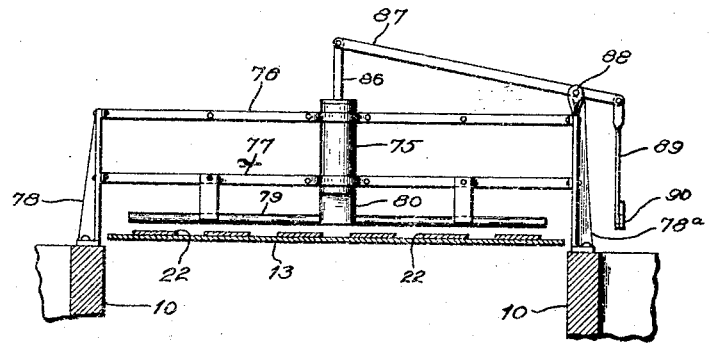

Fig. 17 is an enlarged detail view of the moistening apparatus looking in the direction of the arrow 17 in Fig. 2.

Figure 19:
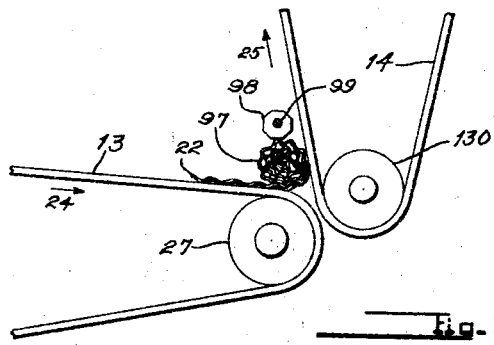
Figure 18:
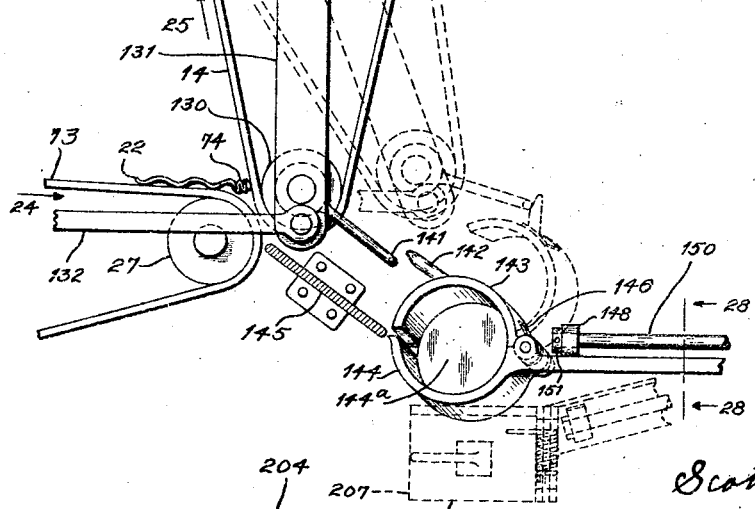

Figs. 18 and 19 are diagrammatic views showing the relative locations of the delivery and forming belts, the ribbon, the product and the compressor during the rolling and compressing operations.

Figure 20:
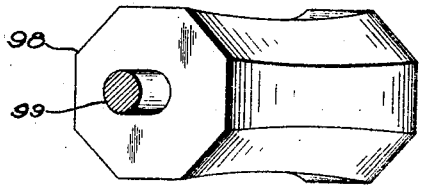

Fig. 20 is a perspective view of one of the compressors.

Figure 21:
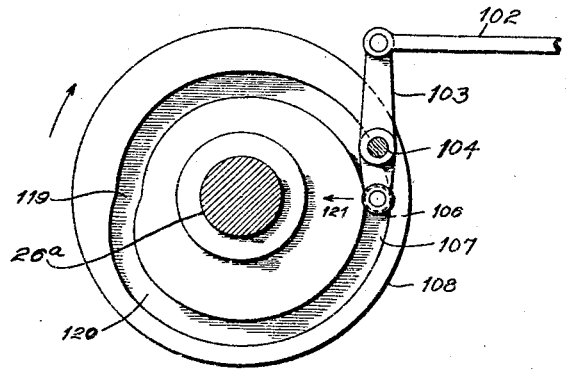

Fig. 21 is a detail view of the compressor cam, the roller and lever operating therewith.

Figure 22:
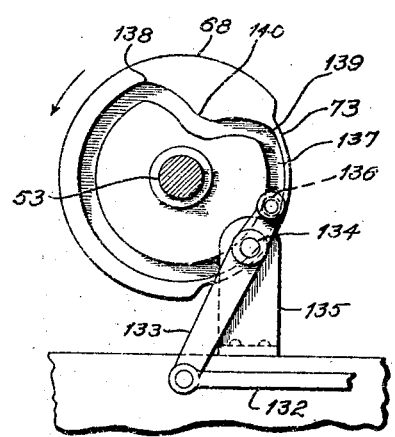

Fig. 22 is a view of the cam 68 and cooperating parts looking in the direction of the arrow $22^a$ in Fig. 2.

Figure 23:
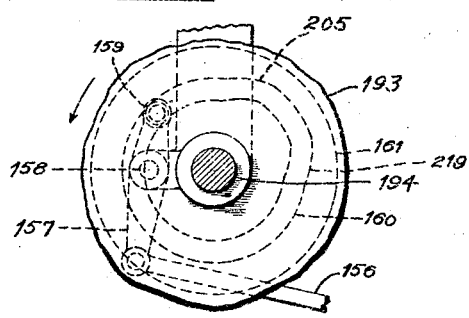

Fig. 23 is a view of the cam 161 and some of the cooperating parts when viewed in the direction of the arrow 23 in Fig. 2.

Figure 24:
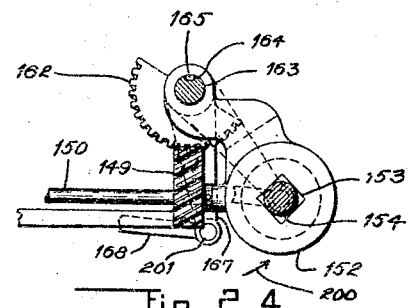

Fig. 24 shows details hereinafter referred to.

Figure 25:
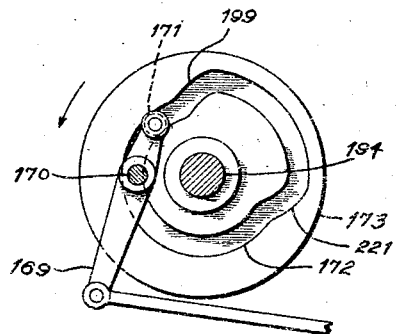

Fig. 25 is a view of the cam 173 looking in the direction of the arrow 23 in Fig. 2.

Fig. 26 is a view of the mechanism for controlling the sleeves 152 viewed in the direction of the arrow 26 in Fig. 2.

Figure 27:
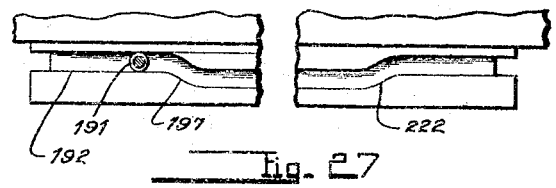

Fig. 27 is a development of the groove 192 formed in the cam 173.

Fig. 28 is a section of a receiver taken along the line 28—28 in Fig. 18 looking in the direction of the arrows in said figure.

Fig. 29 is a view of the cam 216 looking in the direction of the arrow 23 in Fig. 2.

In the drawings:

10 represents a frame which may be provided with any number of supporting legs, one of which is shown at 11, by means of which the machine is supported upon the foundation 12. 13 is the delivery belt and 14 is the forming belt.

Figure 3:
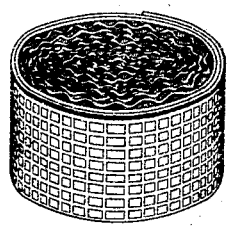
Fig. 3 is a perspective view of one form of product formed by the operation of my improved machine.

By the interaction of the belts 13 and 14, the ribbon formed by the rolls 15 and 16 is rolled into the shape shown in Fig. 3.

The first operation in the production of my improved food product is to prepare the raw material in the form of a ribbon, and the means for forming the ribbon from the raw material will now be described:—

17 is a hopper into which is introduced the raw material. Before the introduction of the raw material within the hopper 17 it may be prepared in any approved manner, as for instance, if wheat is the raw material, the whole grains are cleaned and afterwards steamed or boiled until any desired softness has been obtained. The raw material is introduced within the hopper 17 and carried by gravity between the rolls 15 and 16; the latter are provided upon their ends with pintles 16ª and 16ᵇ which are revolubly mounted in bearings such as 18 which are supported upon the frame 10 in any approved manner.

If desired, the bearings 18 at the corresponding ends of the rolls 15 and 16 may be arranged so that the distance between same can be varied. This is a usual expedient in the art for adjusting the distance between surfaces of rolls and has not, therefore, been shown in detail.

Upon the pintle at one end of the roll 15 there is secured the gear 19 and a similar gear 20 is secured upon the pintle at the corresponding end of the roll 16. The gears 19 and 20 mesh together. A pulley 21 is secured upon the pintle of the roll 16 adjacent to the gear 20.

Power is to be applied to the pulley 21 by a belt and when said power is applied, the revolution of the rolls 15 and 16 compresses the grain and delivers the same in the form of a plurality of ribbons such as 22 upon the belt 13. The grain as it passes through the lower portion of the hopper 17 is divided into a plurality of sections such as 23 by partitions in order that it may emerge from between the rolls in the form of a plurality of ribbons, as just stated.

As a ribbon 22 contacts with the delivery belt 13 it is carried by the latter in the direction of the arrow 24 in Figs. 1 and 7 until its free end touches the belt 14. The belt 14 is moved in the direction of the arrow 25 and it carries the end of the ribbon 22 upwardly, thus beginning the process of rolling the ribbon 22 into cylindrical form.

Figure 4:
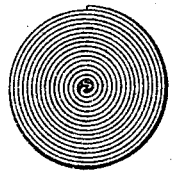
Figs. 4 and 5 are end views of variations in the form of product that may be produced by my machine.
Figure 5:

The belt 13 may have a constant linear velocity approximately equal to the constant linear velocity with which the ribbons 22 emerge from between the rolls 15 and 16. In this case, the product would consist of a flat ribbon rolled into cylindrical form as shown in Fig. 4, or the belt 13 may have a constant linear velocity less than the approximately constant linear velocity with which the ribbons 22 emerge from between the rolls 15 and 16. In this case, the product would consist of an irregularly folded ribbon rolled into cylindrical form as shown in Fig. 5.

If the machine is to be constructed so that the belt 13 has an approximately constant linear velocity, either approximately equal to or less than the approximately constant linear velocity with which the ribbons 22 emerge from between the roller 15 and 16, the belt 13 may be driven by any form of gearing for transmitting power from a pintle of the roll 16 to a pintle of the delivery drum 26, which is partially encircled by the belt 13. The belt 13 is kept taut and in proper position by the idler drum 27. The pintles of the drum 26 are revolubly supported in bearings, one of which is shown at 28 and said bearings are secured to the frame 10 in any approved manner. The pintles of the drum 27 are revolubly mounted in suitable bearings provided in the frame 10.

Instead of driving the belt 13 at an approximately constant linear velocity, I preferably drive same in such a manner that the belt 13 will alternately move at approximately the same and at a less linear velocity than the approximately constant linear velocity with which the ribbon 22 emerges from between the rolls 15 and 16. As a result of this periodical variation in linear velocity of the belt 13, the ribbon 22 is corrugated as it is deposited upon the belt 13, as shown in Fig. 7.

The means by which the variation in linear velocity of the belt 13 is effectuated will now be described:—

The change driving gears 29 and 30 are rigidly secured upon the pintle 16ᵇ of the roll 16 and said gear mesh respectively with the driven gears 31 and 32 which are revolubly mounted upon the pintle 26ª of the delivery drum 26.

The gear 31 is provided with a hub 33 upon its inner face, and shoes 34—34 secured to the ends of the springs 35—35 are pressed against the inner cylindrical surface of said hub by the force of said springs, and the other end of the springs 35—35 are secured to the pintle 26ª. The pressure of the shoes 34—34 against the inner surface of the hub 33 is made such that the drum 26 will be normally driven by the gear 31. The pitch diameter of the gear 31 bears such a relation to the pitch diameter of the gear 29 that the belt 13 is driven in the direction of the arrow 24 at a linear velocity less than the linear velocity with which the ribbons 22 emerge from between the rolls 15 and 16.

During the period in which the drum 26 is being driven by the gear 31, the ridges of the ribbon will be formed during its deposition upon the belt 13, and in order to form the depressions 37 in said ribbon, the following instrumentalities are provided:—

The gear 32 is formed integrally with the ratchet clutch teeth 38 which are engaged periodically by the ends 39—39 of the co-operating clutch member 40. The member 40 is provided with the hub 41 which slides freely upon the outer end of the pintle 26ª but is prevented from turning thereupon by the key 42. A spring 43 placed between the hub 41 and the gear 32 serves to move the member 40 in the direction of the arrow 44. The lever 45 is pivoted at 46 to a portion of the frame. The free end of the lever 45 bears against the hub 41 and a push rod 47 slidably mounted in a guide 48 secured to the frame 10 serves to move the hub 41 in a direction opposite the arrow 44. The push rod 47 is provided with ears 49—49 which embrace the flat face of the cam 50 and prevent the rod 47 from turning.

A roller 51 is revolubly mounted between the ears 49—49 and bears against the curved surface of the corrugating cam 50.

As shown in the drawings, the free end of the lever 45 is at the limit of its motion in the direction of the arrow 44 and the roller 51 is resting in the depression 52 of the cam 50. The gear 31 is thus driving the belt 13 at its minimum speed.

The cam 50 is secured to the shaft 53 which is revolubly mounted in the bearings provided in the pillars 54—54. The gear 55 is secured upon the shaft 53 and meshes with the gear 56 which is revolubly mounted upon the stub shaft 57, the latter being secured to the frame 10.

The gear 56 meshes with the gear 20; consequently, the cam 50 is driven at an approximately constant speed. As the cam 50 moves in the direction of the arrow 58, the lobe 59 is brought into contact with the roller 51, thus moving the push rod 47 in the direction of the arrow 60 and the member 40 in a direction opposite to the arrow 44, thus bringing the end 39 into engagement with the clutch teeth 38. The gear 32 then drives the belt 13 positively overcoming the friction between the shoes 34 and the interior surface of the hub 33.

The relative diameters of the rolls 15 and 16 and the gears 30 and 32 are such that when the gear 32 drives the belt 13 as just explained then the linear velocity of said belt in the direction of the arrow 24 will be substantially equal to the linear velocity with which the ribbons 22 emerge from between the rolls 15 and 16 and a hollow 61 will be formed in the ribbon. When the depression 62 moves opposite the roller 51, the spring 43 will move the member 40 in the direction of the arrow 44, disengaging the ends 39 from the teeth 38. When this happens, the gear 31 will drive the belt 13, as before explained, and a second ridge 36 will be formed.

As the various lobes and depressions of the cam 50 come opposite the roller 51, corresponding hollows and ridges will be formed in each of the ribbons 22. The formation of said hollows and ridges in the ribbon will be continued until the leading end of the portion 63 of the cam 50 moves the roller 51 in the direction of the arrow 60, thus making the linear velocity of the belt 13 approximately equal to the linear velocity with which the ribbons 22 emerge from between the rolls 15 and 16.

During the time that the portion 63 is passing by the roller 51 this condition will obtain and the portion 65 of the ribbon, which is substantially flat, will be deposited upon the belt 13. This cycle continues indefinitely during the operation of the machine; that is, the ribbons are deposited upon the belt 13, each ribbon having a portion consisting of a plurality of ridges alternating with a plurality of hollows and followed by a comparatively long flat portion.

The next operations in the formation of my improved food product are:—Severing of each ribbon near the juncture of the flat portion 65 with the corresponding corrugated portion and the compacting of a few of the corrugations so as to form a nucleus about which the rest of the corrugations can be wound, and also to provide open spaces between the ribbon sections.

The means for performing the severing and compacting operations will now be described:—

The tops of the pillars 54 are cylindrical and the cross bar 66 is slidably mounted thereupon. Rollers 67—67 are mounted upon the ends of the cross bar 66 and rest upon the cutting and compacting cams 68 and 68ª, the latter being rigidly mounted upon the shaft 53. A cutter 69 is secured to the cross bar 66 and extends the full width of the belt 13. Springs 70—70 are mounted upon the cylindrical portion of the pillars 54 between the cross bar 66 and the supports 71—71 of the tank 72. The springs 70—70 keep the rollers 67—67 pressed against the cams 68 and 68ᵃ. The cams 68 and 68ᵃ are shaped as shown in Fig. 14.

When the revolution of the shaft 53 brings the notch 73 under the roller 67, the springs 70—70 force the cutter 69 into contact with the belt 13. The notch 73 is so located that the cutter 69 severs the portion 65 adjacent the beginning of the corrugations and the notch 73 is of sufficient length to permit of the cutter 69 remaining in contact with the belt 13 for a sufficient period to compact a plurality of the corrugations as shown at 74 in Fig. 15.

In order to secure the outer end of the ribbon forming my improved food product, after the same has been rolled up, I preferably moisten said end before it is rolled up. I may use water or a saline solution for moistening said ends, or a saccharine, glutinous, starchy or gelatinous solution and the same may be colored, if desired, to make the outer layer of my improved food product of a different color from the interior layers. The moistening cylinder 75 is secured to the struts 76 and 77 and the latter are secured to the brackets 78 and 78ᵃ supported upon the frame 10. The moistening tube 79 is supported by the strut 77, the ends of said tube are closed and said tube is in communication with the lower end 80 of the cylinder 75.

The tube 79 is provided with a plurality of holes just above each of the ribbons 22. The cylinder 75 is provided with the septum 81 and the piston 82 slides within said cylinder.

Openings provided in the septum 81 and the piston 82 are each controlled by valves 83 and 83ᵃ, respectively, and springs such as 84 and 84ᵃ serve to keep said valves normally closed and open, respectively.

The upper end of the cylinder 75 is closed by the cap 85 through which slides the piston rod 86 to the upper end of which the lever 87 is pivotally connected and said lever is fulcrumed as at 88 upon the bracket 78ᵃ. The other end of said lever is connected by the link 89 with the lever 90, the latter being fulcrumed at 91 upon the bracket 92 which is secured to the frame 10. The other end of the lever 90 is provided with a roller 93 which extends into the groove 94 provided in the inner face of the cam 68ᵃ. As the cam 68ᵃ turns in the direction of the arrow in Fig. 14, the roller 93 is forced downwardly by the portion 95 of the groove 94. This moves the piston 82 in the direction of the arrow in Fig. 16, thus forcing the moistening liquid out through the holes in the tube 79.

The portion 95 is so located that the moistening solution will be forced through the holes in the tube 79 when the flat portions 65 of the ribbons 22 are passing thereunder.

The upper end of the cylinder 75 is connected by the tube 96 with the tank 72.

The next operation in forming my improved food product is that of rolling the ribbon into cylindrical shape and during the latter part of the rolling operation, applying compressive forces at a plurality of points around the periphery of the cylinder into which the ribbon is being rolled.

The means for performing these operations will now be described:

When the compacted portions 74 of the ribbons reach the belt 14 said portion is moved upwardly in the direction of the arrow 25. At the same time the body of the ribbon 22 is being moved in the direction of the arrow 24 and from these movements in results that the ribbon 22 is rolled as shown in Fig. 19 until the product 97 becomes sufficiently large in diameter to contact with the octagonal compressor 98. There is provided an octagonal compressor such as 98 for each ribbon. The ends of these compressors are flat and the remaining faces are concave so that the compressors will apply a greater pressure near the ends of the cylinders than at the centres thereof.

The compressors are rigidly mounted upon the shaft 99 and the latter is revolubly mounted in bearings provided in the arms 100 and 100ᵃ. The arm 100 is provided with the bell crank lever 101 formed integrally therewith, and said lever is connected by the link 102 with one end of the lever 103. The lever 103 is fulcrumed as at 104 upon the bracket 105 which is formed integrally with one of the bearings 28. The roller 106 is mounted at the other end of the lever 103 and said roller extends into the groove 107 provided in the compressor cam 108.

The pulley 109 is rigidly mounted upon the shaft 99 and power is transmitted thereto by the belt 110 which also passes around the pulley 111. The pulley 111 is formed integrally with the pulley 112 and they are revolubly mounted upon the shaft 113, and the latter is revolubly mounted in bearings formed in the frame 10.

The arms 100 and 100ᵃ are rigidly secured to the shaft 113. The belt 114 transmits power to the pulley 112 from the pulley 115 which is mounted upon one pintle of the idler drum 27. Thus the revolution of the drum 27 will revolve the compressors 98.

If, desired, for certain classes of work the compressors 98 may be revolubly mounted upon the shaft 99 so that the former will be revolved by their contact with the product. In this case, the pulleys 109, 111, 112 and 115 and the belts 110 and 114 may be dispensed with. The belt 14 passes around the idler drum 130 which has suitable pintles that are revolubly mounted in bearings provided in the lower ends of the arms 131 and 131ᵃ. The upper ends of said arms are revolubly mounted upon the pintles 123 and 123ª.

Links 132 and 132ª are connected at one end to the arms 131 and 131ª, respectively, and the other ends of said links are connected to the levers 133 and 133ª, respectively. The lever 133 is fulcrumed as at 134 upon a bracket 135 which is secured upon the frame 10 of the machine. The upper end of the lever 133 is provided with a roller 136 which extends into a groove 137 provided in the outer face of the cam 68.

The lever 133ª is similarly fulcrumed upon the bracket 92 and provided with a similar roller which extends into a similar groove provided in the outer face of the cam 68ª.

The groove 137 is substantially concentric with the shaft 53 from the point 138 in a counter clockwise direction to the point 139 and as this portion of the groove is moving by the roller 136, the arms 131 and 131ª will remain in the positions shown in Figs. 1 and 2. As the portion of the groove 137 between the points 138 and 140 is moving past the roller 136, the arms 131 and 131ª will be moved to the position shown dotted in Fig. 18 and during this movement the opener bar 141 will contact with the fingers 142 provided on the cap 143 of the receiver 144 and lift the cap 143 to the position shown dotted in Fig. 18. The cylinder will then roll down the incline 145 into the receiver 144.

The portion of the groove 137 between the points 140 and 139 will then move past the roller 136 and restore the belt 14 and cap 143 to the positions shown by full lines in Fig. 18, and the product will be held within the receiver 144 by the pressure of the spring 146 acting upon the cap 143.

To keep the cylinders in proper location while being roller, septa such as 116 are provided between the compressors 98 and at the ends of the outside compressors. These septa are secured to the strut 117 and the latter is secured to the frame 10 of the machine. The frame of the machine and the septa are provided with slots such as 118 for the passage therethrough of the shaft 99.

When the product 97 contacts with the compressor 98, the corners of the latter compress the product and in order that this compression may not become too great, the compressors are lifted gradually as the product increases in diameter.

As the portion of the groove 107 between the roller 106 as shown in Fig. 21 and the point 119 passes said roller, the roller will be forced in the direction of the arrow 21 in said figure and the compressors 98 will be lifted gradually so that notwithstanding the increasing diameter of the cylinder the edges of said compressors will press thereupon with approximately the same degree of force.

When the portion of the groove 107 between the points 119 and 120 passes by said roller, the compressors 98 will be rapidly dropped from their highest position to their lowest in order to place them in proper location to operate on the succeeding set of cylinders.

It will be noted that the distance from the centre of the pintle 26ª to the groove 107 is practically constant in a clockwise direction from the position in which the roller 106 is shown to about the point 120. As the portion of the groove 107 from the point 120 to the point at which said roller is shown in said figure passes said roller, the compressors 98 dwell in the position shown in Fig. 1.

The septa 116 are provided in order to insure that the ends of the cylinders will be flat. After the cylinders are rolled and compressed, as just described, it is necessary to deliver them to suitable means for transferring them to carriers for transporting the cylinders to a drying or baking oven.

The means for delivering the cylinders to the transferring mechanism will now be described:

The belt 14 passes around the forming drum 122 and the latter is provided with pintles 123 and 123ª, the former being mounted in the bearing 124 and the latter, in the bearings 125 and 126, all of said bearings being secured to the frame of the machine.

The sprocket wheel 127 is secured to the pintle 123ª and power is applied to said wheel by the chain 128 which passes over the sprocket wheel 129 secured to the pintle 26ª.

It is to be noted that by the construction just described, the angular speed of the drum 122 will bear a constant ratio to the angular speed of the drum 26, no matter how the speed of the latter is varied as hereinbefore explained, and the relative speeds of these two drums are to be such that the speeds of the belts 13 and 14 are substantially equal.

Each receiver 144 is provided with a side piece 144ª to retain the product in place.

It is to be noted that the axis 144ᵇ of each receiver is not parallel with the upper surface of the belt 13, but is inclined thereto as shown in Fig. 28 and said axis is also inclined to the shaft 150 as shown in Fig. 2.

The means by which the finished product is transferred from the receiver 144 to the means for carrying the product into the oven will now be described:—

The receiver 144 is formed integrally with the bearing 148 and the sector 149 upon the periphery of which spiral gear teeth are cut. A bearing hole is provided within the sector 149 and the stud shaft 150 passes through said hole and the hole in the bearing 148. Thus, the receiver 144 is revolubly mounted upon the shaft 150 and longitudinal motion with reference to said shaft is prevented by the collar 151 and a shoulder provided upon the sleeve 152. Each of the sleeves 152 is slidably mounted upon the square shaft 153, the latter being provided with pintles 154 and 154ª which are revolubly mounted in bearings provided in the framework of the machine.

Upon the pintle 154ª there is secured the arm 155, the end of which is connected by the link 156 to the lower end of the lever 157. The lever 157 is fulcrumed as at 158 and its upper end is provided with a roller 159 which extends into the groove 160 provided in the face of the cam 161.

The teeth of the sector 149 mesh with similar teeth provided in the sector 162. The sector 162 is slidably mounted upon the shaft 163 having the keyway 164. Each of the sectors 162 has a key 165 secured therein which slides in the keyway 164 and forces the sector 162 to partake of the angular movement of the shaft 163.

Each of the sleeves 152 is provided with two arms 166—166 which embrace the sectors 162 and force said sectors to move laterally with said sleeves. The shaft 163 is provided with an arm 167, the lower end of which is connected by the link 168 with the lower end of the lever 169 which is fulcrumed as at 170 and has a roller 171 upon its upper end which extends into the groove 172 provided in the cam 173.

Near the centre of the shaft 153 the fulcrum block 174 is secured in any approved manner. Said block is provided with a bearing 175 in which the shaft 163 is revolubly mounted, end motion of said shaft being prevented by the collars 176—176 secured thereto.

A stud shaft 177 is provided on the block 174 and the lever 178 and link 179 are revolubly mounted upon said shaft.

Each of the sleeves 152 is provided with studs such as 180. Upon the stud 180 forming part of the sleeve 152 adjacent to the block 174, on the right thereof, there are revolubly mounted the links 181 and 182, the left ends of which are pivotally connected to the lever 178 and the link 179.

Similarly, upon the stud 180ª upon the next sleeve 152, there are revolubly mounted the links 183 and 184, the left ends of which are pivotally connected, respectively, to the right ends of the links 181 and 182.

Similarly, upon the stud 180ᵇ of the next sleeve 152, there are revolubly mounted the links 185 and 186, the ends of which are pivotally connected, respectively, to the right ends of the links 183 and 184.

The upper end of the lever 178 is pivotally connected to the link 187 and the other end of said link is pivotally connected to one end of the lever 188 which is fulcrumed at 189 upon a bracket 190 secured to the frame of the machine.

A roller 191 revolubly mounted upon the lever 188 projects within the groove 192 formed in the cam 173.

The cams 161 and 173 are formed integrally with the sprocket wheel 193 and they are rigidly mounted upon the shaft 194 which is revolubly mounted in suitable bearings provided in the bed plate of the machine.

A chain 195 delivers power to the wheel 193 from the sprocket wheel 196. The sprocket wheel 196 is rigidly mounted upon the shaft 53.

The product having been dropped into the receiver 144 and the opener bar 141 having moved back to the position shown by full lines in Figs. 1 and 18, the incline 197 of the groove 192 engages the roller 191 and moves the link 187 in the direction of the arrow 198 in Fig. 2, thus moving the lever 178 and the links 181, 182, 183, 184, 185 and 186 from the positions shown by full lines in Fig. 26 to the positions shown by dotted lines in said figure. These links are so sized and positioned that the sleeve 152 next on the right of the block 174 will be moved one-half of the distance necessary to provide sufficient clearance for the receivers 144 to turn as hereinafter specified. The next sleeve 152 will be moved one and one-half times this distance and the next succeeding sleeve will be moved two and one-half times this distance. Hence, it is evident that the spaces between the sleeves 152 after these motions take place will all be equal.

The incline 199 of the groove 172 then engages the roller 171 and moves the arm 167 in the direction of the arrow 200 in Fig. 24 until the pivotal connection 201 between said arm and the link 168 is in alignment with the axis of the shaft 153.

The spiral teeth in the sectors 149 and 162 are cut in such directions that during this movement of the arm 167, each of the receivers 144 will be turned in the direction of the arrow 202 in Fig. 28 so that the face 203 of the receiver 144 and its corresponding cap 143 will be parallel with the oven belt 204 as shown in Fig. 28. The incline 205 of the groove 160 then engages the roller 159 and moves the arm 155 in the direction of the arrow 206 in Fig. 1, thus moving the receivers 144 and cap 143 to the positions shown dotted at 207 in Figs. 18 and 28.

It is to be noted that the edge 203 in this last-named position is parallel with the oven belt 204. This parallelism results from the inclined positions of the axis 144^b hereinbefore described.

While the receivers are in the positions shown at 207, it is necessary to slightly open the cap 143 in order to permit the product to drop upon the belt 204.

The means for opening the caps will now be described:—

The shaft 208 is revolubly mounted in suitable bearings provided in the framework of the machine and a plurality of cams such as 209 is secured upon said shaft, each cam being located to contact with the finger 142 as shown in Fig. 28. The arm 210 is secured upon the shaft 208 and is connected by the link 211 with the lower end of the lever 212. The lever 212 is fulcrumed as at 213 and is provided with a roller 214 which engages a groove 215 in the cam 216. The cam 216 is secured upon the shaft 194.

Shortly after the receiver 144 reaches the position 207, the incline 217 of the groove 215 engages the roller 214 and moves the arm 210 in the direction 218 in Fig. 1, moving the cams 209 in the same direction, and the latter acting upon the fingers 142 of the caps 143 open said caps and permit the product to drop upon the belt 204. The incline 219 of the groove 160 then engages the roller 159 and moves the arm 155 in a direction opposite to the arrow 206, thus lifting the receiver 144 to the upper dotted position in Fig. 28.

It is to be noted that the cams 209 are sufficiently broad that the fingers 142 do not move off the same during this motion of the receivers 144. The incline 220 of the groove 215 then engages the roller 214 and restores the cams 209 to the positions shown in Fig. 1. The incline 221 of the groove 199 then engages the roller 171 and restores the receivers to the positions shown by full lines in Figs. 1 and 2. The incline 222 of the groove 192 then engages the roller 191 and moves the sleeves 152 along the shaft 153 to the positions shown in Figs. 1 and 2, and thus the receivers 144 are in position to receive the next cylinder which has been prepared as hereinbefore described during the time in which the preceding cylinder was being transferred from the receiver 144 to the belt 204.

The belt 204 is made of any suitable material and is revolved by the drums 223—223, the latter being provided with pintles which are revolubly mounted in bearing blocks 224—224. The bearing blocks 224 are formed integrally with the threaded portions 225—225 and nuts 226—226 threaded thereon and engaging the supports 227—227 serve to adjust the relative positions of the belt 204 and the receivers 144. The supports 227 are mounted upon the foundation 12.

Struts such as 228 are secured to the blocks 224 and said studs support a plurality of drums such as 229 which may be used to support the belt 204. The drum at the right of Fig. 1 must be placed in such a position that a drying or baking oven could be placed between it and the end 230 of the frame 10.

From the foregoing description of the structure and explanation of the operation of the several elements comprising my improved machine, it will be obvious that all operations are carried out automatically from the time the raw material is placed in the hopper 17 until the finished product is delivered at the right hand end of the belt 204.

The biscuit illustrated in Fig. 3 is formed of a striated ribbon that is provided with cross bars, and for the purposes of forming the ribbon the rolls 15 and 16 are suitably engraved. The rolls are not shown engraved in the drawings for the sake of clearness.

It is to be understood that the ribbon may be formed without the striæ and cross bars. In this case the rolls would be plain or the rolls may be engraved in any desired design so as to impress the design upon the ribbons, or to perforate the ribbons.

The cutter 69, the moistening tube 79, the compressors 98 and the forming belt 14 are mounted in such relations to each other and to the rolls 15 and 16 that the operations herein explained will be carried out as set forth.

It is to be understood that for the purpose of illustration the machine is shown shorter in Figs. 1 and 2 than it would be in practice. The machine may be made of any desired length and the elements enumerated placed in any suitable mutual relations, it being understood that the cams are to be suitably located so as to cause the various movements as and at the times set forth. This mutual timing of the cams is a matter well understood in the art and has not, therefore, been particularly herein set forth.

Figure 6:
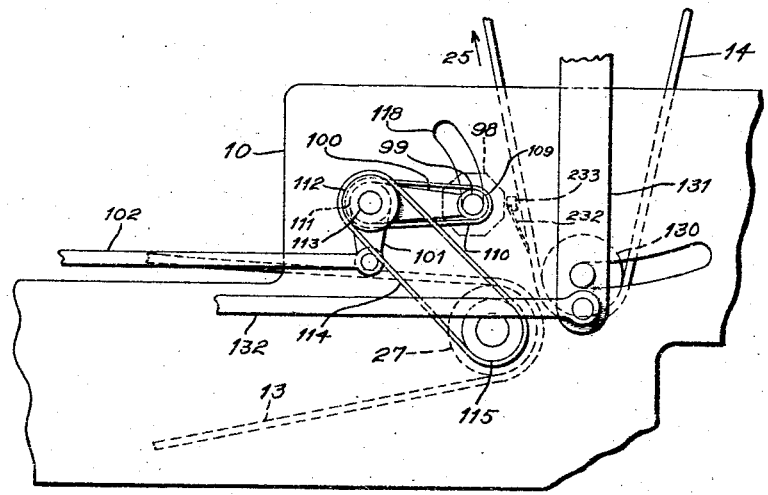
Fig. 6 is an enlarged detail view of a scraper and compressor that aid in the formation of my improved product.

If the raw material from which the biscuits are made is of a sticky nature, a scraper such as 231 may be applied to the roll 16 and a similar scraper may be applied to the roll 15. These scrapers being well known in the art have not been particularly illustrated. Similarly a scraper 232 may be arranged to bear against the belt 14 as shown in Fig. 6. Said belt is secured to the strut 233 and the latter is secured to the side frames 10.

While I have shown my improved machine as organized to produce a food product having the ribbon formed as shown in Fig. 3, yet I do not desire to be limited to such a construction for it is evident that by properly shaping the corrugating cam 50, the ribbon may be folded as shown in Fig. 5. Therefore when in the claims the word "corrugation", or "corrugations" is used, it is to be understood that it is intended to cover a ribbon formed either as shown in Fig. 3 or as shown in Fig. 5.

While I have stated that the forming belt is to run at approximately the same speed as the delivery belt, yet I do not desire to be limited to this relation. The forming belt, may also run either slower or faster than the delivery belt.

It is also to be understood that by reason of the perforations or striations in the ribbon and the corrugations of the same, the greatest freedom is provided for the access of heat thereto during the baking or drying operations. As a consequence, my improved food product during mastication is not reduced to a pulp like form, but the ultimate particles of the conglomerate are granular in form and the saliva and the digestive juices can readily permeate the mass.

I claim:

1. In a machine for making food products, the combination with means for receiving the raw material and means for forming said material into a ribbon, of means for compacting an end of said ribbon.

2. In a machine for making food products, the combination with means for receiving the raw material and means for forming said material into a ribbon, of means for compacting the front end of said ribbon.

3. In a machine for making food products, the combination with means for receiving the raw material and means for forming said material into a ribbon, of means for moistening said ribbon at predetermined locations.

4. In a machine for making food products, the combination with means for receiving the raw material and means for forming said material into a ribbon, of means for moistening said ribbon at predetermined locations during the rolling operation.

5. In a machine for making food products, the combination with means for receiving the raw material and means for forming said material into a ribbon, of means acting to corrugate part of said ribbon.

6. In a machine for making food products, the combination with means for receiving the raw material and means for forming said material into a ribbon, of a delivery belt for receiving said ribbon and means for periodically varying the speed of said belt.

7. In a machine for making food products, the combination with means for receiving the raw material and means for forming said material into a ribbon, of a delivery belt for receiving said ribbon, means for driving said belt at a speed less than the speed at which said ribbon is formed and means for periodically increasing the speed of said belt.

8. In a machine for making food products, the combination with means for receiving the raw material and means for forming said material into a ribbon, of a delivery belt for receiving said ribbon, a drum for driving said belt, a clutch for transmitting power to said drum to drive said belt at a predetermined speed, a second clutch for transmitting power to said drum to change the speed of said belt and means for controlling the operation of said second clutch.

9. In a machine for making food products, the combination with means for receiving the raw material and means for forming said material into a ribbon, of a delivery belt for receiving said ribbon, a drum for driving said belt, a friction clutch for transmitting power to said drum to drive said belt at a predetermined speed, a toothed clutch for transmitting power to said drum to increase the speed of said belt, a cam and connections for controlling the operation of said toothed clutch.

10. In a machine for making food products, the combination with means for receiving the raw material and means for forming said material into a ribbon, of a delivery belt for receiving said ribbon, means for forming corrugations in said ribbon, and means for compacting a plurality of said corrugations.

11. In a machine for making food products, the combination with means for receiving the raw material and means for forming said material into a ribbon, of a delivery belt for receiving said ribbon, means for forming corrugations in said ribbon, and unitary means for severing said ribbon and for compacting a plurality of said corrugations.

12. In a machine for making food products, the combination with means for receiving the raw material and means for forming said material into a ribbon, of a delivery belt for receiving said ribbon, means for forming corrugations in said ribbon, means for compacting a plurality of said corrugations and means for winding said corrugations around said compacted corrugations.

13. In a machine for making food products, the combination with means for receiving the raw material and means for forming said material into a ribbon, of a delivery belt for receiving said ribbon, means for forming corrugations in a portion of said ribbon, means for compacting a plurality of said corrugations and means for winding said corrugations about said compacted corrugations and the uncorrugated portion of said ribbon about said corrugations.

14. In a machine for making food products, the combination with means for receiving the raw material and means for forming said material into a ribbon, of means for corrugating said ribbon at predetermined locations and means for terminating the action of the means for corrugating said ribbon to provide a predetermined length of uncorrugated ribbon.

15. In a machine for making food products, the combination with means for receiving the raw material and means for forming said material into a ribbon, of means for corrugating said ribbon at predetermined locations, means for terminating the action of the means for corrugating said ribbon to provide a predetermined length of uncorrugated ribbon and means for moistening said length.

16. In a machine for making food products, the combination with means for receiving the raw material and means for forming said material into a ribbon, of means for rolling said ribbon into the form of a cylinder, a revolving compressor for compressing said cylinder and means for varying the position of said compressor during the rolling operation.

17. In a machine for making food products, the combination with means for receiving the raw material and means for forming said material into a ribbon, of means for rolling said ribbon into the form of a cylinder, a revolving compressor for compressing said cylinder, a cam and connections for varying the position of said compressor during the rolling operation.

18. In a machine for making food products, the combination with means for receiving the raw material and means for forming said material into a ribbon, of means for rolling said ribbon into the form of a cylinder and a revolving compressor for compressing said cylinder, said compressor having a plurality of edges for compressing said cylinder in spaced locations.

19. In a machine for making food products, the combination with means for receiving the raw material and means for forming said material into a ribbon, of means for rolling said ribbon into the form of a cylinder and a revolving compressor for compressing said cylinder, said compressor having a plurality of edges formed by concave surfaces for compressing said cylinder in spaced locations near the ends thereof.

20. In a machine for making food products, the combination with means for receiving the raw material and means for forming said material into ribbons, of means for rolling said ribbons into cylinders, compressors for compressing said cylinders, and partitions between said compressors.

21. In a machine for making food products, the combination with means for receiving the raw material and means for forming said material into a ribbon, of a delivery belt for receiving said ribbon, a forming belt cooperating with said delivery belt to roll said ribbon into the form of a cylinder and means for periodically varying the speeds of said belts.

22. In a machine for making food products, the combination with means for receiving the raw material and means for forming said material into a ribbon, of a delivery belt for receiving said ribbon, a forming belt cooperating with said delivery belt to roll said ribbon into the form of a cylinder, a pair of drums for supporting said forming belt, movable bearings for one drum and a cam and connections for moving said bearings to provide an opening between said belts for the passage of said cylinder.

23. In a machine for making food products, the combination with means for receiving the raw material and means for forming said material into a cylinder, a receiver for grasping said cylinder, an oven belt, and means for moving said receiver to transfer said cylinder to said belt with a flat face of said cylinder resting upon said belt.

24. In a machine for making food products, the combination with means for receiving the raw material and means for forming said material into cylinders, a plurality of receivers, one receiver for grasping each cylinder, means for moving said receivers to increase the distance between adjacent receivers, an oven belt and means for moving said receivers to bring one flat face of each of said cylinders approximately parallel with said belt.

25. In a machine for making food products, the combination with means for receiving the raw material and means for forming said material into cylinders, a plurality of receivers, one receiver for grasping each cylinder, a shaft for slidably supporting said receivers and means for sliding said receivers along said shaft.

26. In a machine for making food products, the combination with means for receiving the raw material and means for forming said material into cylinders, a plurality of receivers, one receiver for grasping each cylinder, sleeves comprising stud shafts for revolubly supporting said receivers, a shaft for slidably supporting said sleeves, means for revolving said receivers and means for moving said sleeves along said shaft.

27. In a machine for making food products, the combination with means for receiving the raw material and means for forming said material into cylinders, a plurality of receivers, one receiver for grasping each cylinder, sleeves, a shaft for slidably supporting said sleeves, a lazy tongs pivoted to said sleeves, a cam and connections for moving said tongs.

28. In a machine for making food products, the combination with means for receiving the raw material and means for forming said material into cylinders, a plurality of receivers, one receiver for grasping each cylinder, sleeves comprising stud shafts for revolubly supporting said receivers, a cam, and connections for revolving said receivers.

29. In a machine for making food products, the combination with means for receiving the raw material and means for forming said material into cylinders, a plurality of receivers, one receiver for grasping each cylinder, a shaft for supporting said receivers, a cam and connections for revolving said shaft.

30. In a machine for making food products, the combination with means for receiving the raw material and means for forming said material into a cylinder, a receiver for receiving said cylinder, a cap on said receiver for grasping said cylinder, means for closing said cap and means for opening said cap.

31. In a machine for making food products, the combination with means for receiving the raw material and means for forming said material into a cylinder, a receiver for receiving said cylinder, a cap on said receiver, means for opening said cap to permit the passage of said cylinder to said receiver, a spring for pressing said cap against said cylinder, an oven belt, means for moving said receiver to bring said cylinder adjacent said belt and means for opening said cap to deposit said cylinder on said belt.

32. In a machine for making food products, the combination with means for receiving the raw material and means for forming said material into a cylinder, a receiver for receiving said cylinder, a cap on said receiver, means for opening said cap to permit the passage of said cylinder to said receiver, a spring for pressing said cap against said cylinder, a cam for opening said cap, a second cam and connections for operating said first named cam.

33. In a machine for making food products, the combination with means for receiving the raw material and means for forming said material into a cylinder, an oven belt, a receiver for receiving said cylinder and depositing same on said belt, and means for adjusting the relative positions of said receiver and belt.

34. In a machine for making food products, the combination with means for receiving the raw material and means for forming said material into cylinders, a plurality of receivers, one receiver for grasping each cylinder, sleeves comprising stud shafts for revolubly supporting said receivers, a shaft for slidably supporting said sleeves, a second shaft revolubly supported by said sleeves, gear sectors slidably mounted on said second shaft and revolved thereby and moving with said sleeves and a gear sector on each of said receivers meshing with one of said first named sectors.

35. In a machine for making food products, the combination with means for receiving the raw material, of means for forming the same into a cylinder formed of rolled ribbon, an oven belt, and means for depositing said cylinder on said belt to rest on one base thereof.

36. In a machine for making food products, the combination with means for receiving the raw material, of rolling means and wrapping means for forming said material into a cylinder formed of rolled corrugated ribbon.

37. In a machine for making food products, the combination with means for receiving the raw material, of rolling means, wrapping means for forming said material into a cylinder formed of rolled ribbon, and means for compressing said ribbon during the wrapping operation and after said cylinder reaches a predetermined diameter.

38. The herein described process of producing a food product which consists in shaping the raw material into the form of a ribbon, rolling said ribbon into the form of a cylinder and compressing said cylinder during the rolling operation after said cylinder reaches a predetermined diameter.

39. The herein described process of producing a food product which consists in shaping the raw material into the form of a ribbon, rolling said ribbon into the form of a cylinder and compressing said cylinder near the end faces thereof during the rolling operation, after said cylinder reaches a predetermined diameter.

40. The herein described process of producing a food product which consists in shaping the raw material into the form of a corrugated ribbon, rolling said ribbon into the form of a cylinder and compressing said cylinder during the rolling operation, after said cylinder reaches a predetermined diameter.

41. In a machine for making food products, the combination with means for receiving the raw material and means for forming said material into cylinders, of a plurality of receivers, one receiver for each cylinder, a shaft for slidably supporting said receivers and means for sliding said receivers along said shaft.

In testimony whereof, I affix my signature.

SCOTT H. PERKY.